(12) United States Patent
Li et al.

(10) Patent No.: US 7,647,331 B2
(45) Date of Patent: Jan. 12, 2010

(54) DETECTING DUPLICATE IMAGES USING HASH CODE GROUPING

(75) Inventors: Mingjing Li, Beijing (CN); Bin Wang, Beijing (CN); Wei-Ying Ma, Beijing (CN); Zhiwei Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 171 days.

(21) Appl. No.: 11/277,727

(22) Filed: Mar. 28, 2006

(65) Prior Publication Data

US 2007/0239756 A1    Oct. 11, 2007

(51) Int. Cl.
G06F 7/00 (2006.01)
G06F 17/00 (2006.01)
G06K 9/56 (2006.01)
G06K 9/68 (2006.01)

(52) U.S. Cl. .................... 707/101; 707/104.1; 382/205; 382/219

(58) Field of Classification Search ........................ None
See application file for complete search history.

(56) References Cited

U.S. PATENT DOCUMENTS

| | | | | |
|---|---|---|---|---|
| 5,668,897 A * | 9/1997 | Stolfo | ........................ | 382/283 |
| 5,852,823 A * | 12/1998 | De Bonet | ........................ | 707/6 |
| 5,873,080 A | 2/1999 | Coden et al. | | |
| 6,961,463 B1 * | 11/2005 | Loui et al. | ........................ | 382/170 |
| 6,996,280 B1 * | 2/2006 | Matsukawa et al. | .......... | 382/236 |
| 7,046,851 B2 * | 5/2006 | Keaton et al. | ................ | 382/218 |
| 7,457,825 B2 | 11/2008 | Li et al. | | |
| 2002/0087538 A1 * | 7/2002 | Abdel-Mottaleb et al. | ..... | 707/6 |
| 2002/0168117 A1 | 11/2002 | Lee et al. | | |
| 2004/0126019 A1 * | 7/2004 | Ikebe et al. | ................ | 382/232 |
| 2005/0084154 A1 * | 4/2005 | Li et al. | ...................... | 382/190 |
| 2005/0100219 A1 * | 5/2005 | Berkner et al. | ............. | 382/190 |
| 2005/0120311 A1 * | 6/2005 | Thrall | ........................ | 715/811 |
| 2006/0088191 A1 * | 4/2006 | Zhang et al. | ................ | 382/107 |
| 2006/0218192 A1 | 9/2006 | Gopalakrishnan | | |
| 2008/0082426 A1 * | 4/2008 | Gokturk et al. | ............... | 705/27 |

OTHER PUBLICATIONS

Qamra et al. "Enhanced perceptual distance functions and indexing for image replica recognition" Dept. of Comput. Sci., California Univ., Santa Barbara, CA, USA.*

(Continued)

*Primary Examiner*—Pierre M Vital
*Assistant Examiner*—Berhanu Mitiku
(74) *Attorney, Agent, or Firm*—Perkins Coie LLP

(57) ABSTRACT

A duplicate image detection system generates an image table that maps hash codes of images to their corresponding images. The image table may group images according to their group identifiers generated from the most significant elements of the hash codes based on significance of the elements in representing an image. The image table thus segregates images by their group identifiers. To detect a duplicate image of a target image, the detection system generates a target hash code for the target image. The detection system then identifies the group of the target image based on the group identifier of the target hash code. After identifying the group identifier, the detection system searches the corresponding group table to identify hash codes that have values that are similar to the target hash code. The detection system then selects the images associated with those similar hash codes as being duplicates of the target image.

13 Claims, 7 Drawing Sheets

OTHER PUBLICATIONS

R. Venkatesan et al. "Robust Image Hahing" Cryptograplly Group, Microsoft Research, 1 Microsoft Way, Redmond, WA 98052-6399, 2000.*

Yen Ke et al. "Efficient Near-duplicate Detection and Sub-image Retrieval" School of Computer Science, Carnegie Mellon University, Oct. 10-16, 2004, New York, New York, USA, ACM, pp. 869-876.*

Zhang et al. "Detecting Image Near-Duplicate by Stochastic Attribute Relational Graph Matching with Learning" Department of Electrical Engineering, Columbia University, New York, NY 10027. pp. 877-884 Year of Publication: 2004.*

Luo et al. "A World Wide Web Based Image Search Engine Using Text and Image Content Features", Department of Information Engineering, The Chinese University of Hong Kong, Electronic Imaging, SPIE vol. 5018 (2003).*

Tu et al. "Image Parsing: Unifying Segmentation, Detection, and Recognition", University of California, Los Angeles Los Angeles, CA, 90095Proceedings of the Ninth IEEE International Conference on Computer Vision (ICCV 2003) 2-Volume Set.*

U.S. Appl. No. 12/247,958, filed Oct. 8, 2008, Li et al.

"W3C Document Object Model (DOM)," Jan. 19, 2005, Copyright 1997-2005 W3C, 3 pages.

Bodner, Richard C. and Song, Fei, "Knowledge-Based Approaches to Query Expansion in Information Retrieval," Advances in Artificial Intelligence (pp. 146-158), 1996, New York Springer, 14 pages.

Carson, Chad et al., "Blobworld: Image Segmentation Using Expectation-Maximization and its Application to Image Querying," IEEE Transactions on PAMI, vol. 24, No. 8, 2002 (16 pages).

Chang, Edward, Li, Chen, Wang, James, Mork, Peter, Wiederhold, Gio, "Searching Near-Replicas of Images Via Clustering," Proceedings of SPIE Multimedia Storage and Archiving System VI, vol. 3846, Boston, Sep. 1999 (17 pages).

Chen, Zheng et al., "iFind: A Web Image Search Engine," SIGIR'01, New Orleans, Sep. 9-12, 2001, ACM (1 page).

Ferhatosmanoglu, Hakan, et al., "Vector Approximation based Indexing for Non-uniform High Dimensional Data Sets," University of California, Santa Barbara, CIKM 2000, McLean, VA, USA, (8 pages).

Flickner, Myron et al., "Query by Image and Video Content: The QBIC System," IEEE Computer Special Issue on Content-Based Retrieval, vol. 28, No. 9, Sep. 1995, pp. 23-32.

Goh, King Shy et al., "Multimodal Concept-Dependent Active Learning for Image Retrieval," MM'04, Oct. 10-16, 2004, New York, pp. 564-571.

Google Mobile Search, 2005 Google, [Last Accessed Nov. 9, 2005], (1 page) http://www.google.com/xhtml/help?hl=en&lr=&ie=UTF-8.

Google, "Google Short Message Service (SMS)," Copyright 2005 Google, 1 page.

Herley, Cormac, "Why Watermarking is Nonsense," Signal Processing Magazine, Sep. 2002, Microsoft Research, Microsoft Corporation.

Jaimes, Alejandro et al., "Detection of Non-Identical Duplicate Consumer Photographs," Proceedings of Fourth IEEE PCM, Singapore, Dec. 2003 (5 pages).

Kim, Changick, "Content-Based Image Copy Detection," Signal Processing: Image Communication, vol. 18, 2003, pp. 169-184.

Lin, Shu, et al., "An Extendible Hash for Multi-Precision Similarity Querying of Image Databases," Proceedings of the 27th VLDB Conference, Rome, Italy, 2001 (10 pages).

Miller, George A., "WordNet: A Lexical Database for English," Communications of the ACM, vol. 38, No. 11, Nov. 1995, pp. 39-41.

Muneesawang, Paisan et al., "Audiovisual Cues For Video Indexing and Retrieval," Advances in Multimedia Information Processing, PCM 2004, Oct. 29, 2004, pp. 642-649.

Noda, Makiko et al., "Cosmos: Convenient Image Retrieval System of Flowers for Mobile Computing Situations," Proceedings of the IASTED Conference on Information Systems and Databases, Tokyo, Japan, Sep. 2002 (6 pages).

Porter, M.F., "An algorithm for suffix stripping," Program, vol. 14 No. 3, 1980, (7 pages).

Riskin, Eve A., "Optimal Bit Allocation via the Generalized BFOS Algorithm," IEEE Transactions on Information Theory, vol. 37, No. 2, Mar. 1991, pp. 400-402.

Sebe, N. et al., "Evaluation of Salient Point Techniques," Image and Vision Computing, vol. 21, 2003 (10 pages).

Smith, John R. and Chang, Shih-Fu et al., "Visually Searching the Web for Content," IEEE Multimedia, vol. 4, Issue 3, Jul. 1997, pp. 12-20.

Smith, John R., and Chang, Shih-Fu, "VisualSEEk: A Fully Automated Content-Based Image Query System," In Proceedings of ACM Multimedia 96, Boston, MA, Nov. 20, 1996 (12 pages).

Sonobe, Hirotaka et al., "Mobile Computing System for Fish Image Retrieval," Proceedings of International Workshop on Advanced Image Technology, Singapore, Jan. 2004 (6 pages).

Srihari, Rohini K. et al., "Intelligent Indexing and Semantic Retrieval of Multimodal Documents," Information Retrieval, vol. 2, 2000, pp. 245-275.

Vorhees, Ellen M., "Query Expansion Using Lexical-Semantic Relations," Proceedings of the 17th Annual ACM SIGIR Conference, Dublin, Ireland, Jul. 1994, pp. 61-69.

Yahoo! Mobile, Copyright 2005 Yahoo! (Last Accessed Nov. 11, 2005) (1 page) http://mobile.yahoo.com/.

Yeh, Tom et al., "A Picture is Worth a Thousand Keywords: Image-Based Object Search of a Mobile Platform," Proceedings of CHI 2005, Portland, Apr. 2004, ACM (4 pages).

Yeh, Tom et al., "Searching the Web with Mobile Images for Location Recognition," Proceedings of the 2004 IEEE Computer Society Conference on Computer Vision and Pattern Recognition (CVPR '04), © 2004 IEEE (6 pages).

* cited by examiner

DETECTING DUPLICATE IMAGES USING HASH CODE GROUPING

BACKGROUND

Many search engine services, such as Google and Overture, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service identifies web pages that may be related to the search request based on how well the keywords of a web page match the words of the query. The search engine service then displays to the user links to the identified web pages in an order that is based on a ranking that may be determined by their relevance to the query, popularity, importance, and/or some other measure.

The Internet is being increasingly used to search for and view images (e.g., photographs). To support this use, commercial search engine services have located and indexed over 1 billion images since 2005. The indexing techniques for images of web pages typically work in a similar manner to the indexing of web pages. Once a search engine service identifies an image, it attempts to identify keywords related to that image from text surrounding the image on the web page that contains the image or from text surrounding links on other web pages that reference the web page that contains the image. The search engine service then creates a mapping from those keywords to the image. A user can then submit a textual query when searching for an image. For example, a user who is interested in locating images relating to a tiger may submit the query "tiger animal." The search engine service may then search the keyword indexes for the keywords "tiger" and "animal" to locate the related images. The search engine service displays a thumbnail of each related image as the search result. Since many web pages may contain different copies of the same image, a search result may include many duplicate images. To improve the user's experience, a search engine service may want to identify and remove, or at least group together, duplicate images. Unfortunately, current techniques for detecting duplicate images are typically too slow to be performed in real time or are too inaccurate to be particularly useful.

The rapid and accurate identification of duplicate images would be useful in many applications other than a search engine service. For example, the owner of a copyright in an image may want to crawl the web searching for duplicate images in an attempt to identify copyright violations. Indeed, an organization that sells electronic images may have millions of images for sale. Such an organization may periodically want to crawl the web to check for unauthorized copies of its millions of images. The speed and accuracy of duplicate images detection are very important to such an organization.

SUMMARY

A method and system for detecting duplicate images using groups of hash codes is provided. A duplicate image detection system generates an image table that maps hash codes of images to their corresponding images. The image table may group images according to their group identifiers generated from the most significant elements (e.g., bits) of the hash codes. The images in a group have the same value for the most significant elements of their hash codes. The image table may also include a group table for each group. A group table for a group contains a mapping for each image within the group from its hash code to the image. To detect a duplicate image of a target image, the detection system generates a target hash code for the target image. The detection system then identifies the group of the target image based on the group identifier of the target hash code. After identifying the group identifier, the detection system searches the corresponding group table to identify hash codes that have values that are similar to the target hash code. The detection system then selects the images associated with those similar hash codes as being duplicates of the target image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
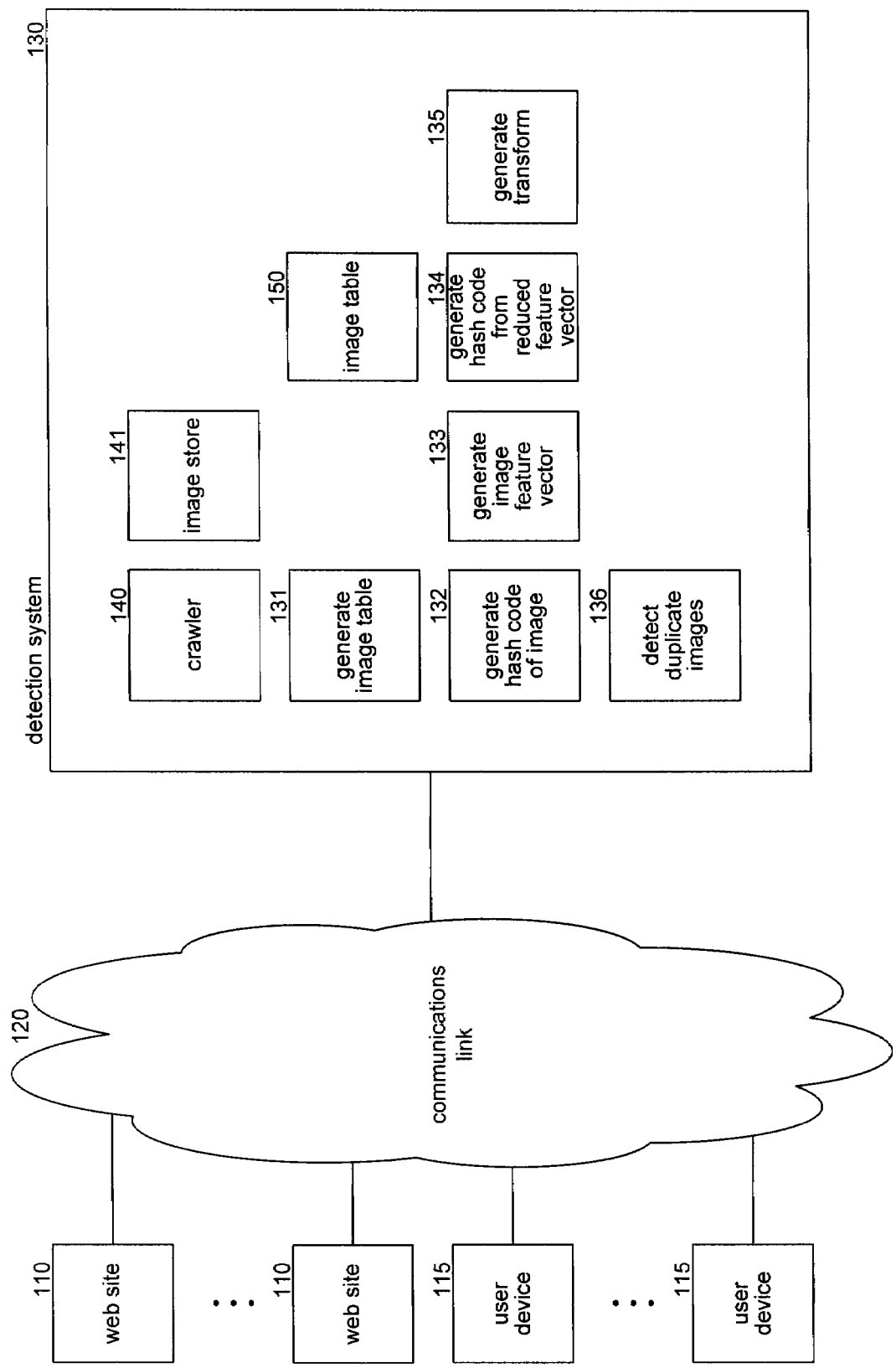
FIG. 1 is a block diagram that illustrates components of the detection system in one embodiment.

A method and system for detecting duplicate images using groups of hash codes is provided. In one embodiment, a duplicate image detection system generates an image table that maps hash codes of images to their corresponding images. The image table may include a group index that has an entry for each group. The images in a group have the same value for the most significant elements of their hash codes, referred to as a group identifier. For example, if a hash code has 32 bits, then the detection system may define a group using the most significant 8 bits of the hash code as a group identifier. Images with the same values for their 8 most significant bits are in the same group. The image table may also include a group table for each group. A group table for a group contains a mapping for each image within the group that identifies the hash code for the image and includes a reference to the image. For example, if a group is defined by the 8 most significant bits of the hash code, then the image table may contain 256 group tables—one for each of the different possible values of the group identifier. Each group table may represent approximately 16 million hash codes corresponding to the remaining 24 bits of the hash code. Since the image table may itself contain duplicate images and very similar images that have the same hash code, each hash code may map to multiple images. A search engine service may generate an image table for its indexed images to help detect duplicate images in a search result. To detect a duplicate image of a target image, the detection system generates a target hash code for the target image. The detection system then identifies the group of the target image based on the group identifier of the target hash code. After identifying the group identifier, the detection system searches the corresponding group table to identify hash codes that have values that are similar to the target hash code. Since the group identifiers are the same, the detection system bases similarity on the remaining elements of the hash code. For example, the detection system may determine that the hash codes are similar when the values of the least significant bits differ in less than a threshold number of elements. For example, if the remaining elements of the target hash code are "S . . . S10101" and the remaining elements of the hash code of an image being checked are "S . . . S00110" (where S represents the same bit values in both), then the hash codes differ in only 3 places (i.e., bits 0, 1, and 4 with the left-most bit being bit 0). If the threshold is 2, then the hash codes are not similar. In contrast, if the threshold is 4, then the hash codes are similar. The detection system then selects the images associated with those similar hash codes as being duplicates of the target image. In this way, the detection system can detect both rapidly and accurately that a target image is a duplicate of an image in the image table.

In one embodiment, the detection system generates a hash code for an image by generating a feature vector for the image, reducing the dimension of the feature vector, and then creating a hash code from the reduced feature vector. The detection system may extract a variety of features to represent a feature vector such as a color correlogram, a color histogram, and so on. In one embodiment, the detection system generates a feature vector for an image based on average luminance of blocks within a grayscale representation of the image. The detection system divides an image into n-by-n blocks and calculates the average luminance for each block. The detection system represents the feature vector as a sequence of the average luminance of each block. The detection system may calculate average luminance of a block according to the following:

$$f_k = \frac{1}{N_k} \sum_{i,j \in B_k} I(i, j) \, k = 1, 2, \ldots, n^2$$

where $f_k$ represents the value of element k of the feature vector, $N_k$ represents the number of pixels in block $B_k$ of the image, $n^2$ represents the number of blocks, i and j index pixels of block $B_k$, and I (i,j) represents the luminance of the pixels indexed by i and j. The detection system may generate a feature vector that includes the average luminance calculated at blocks of varying size. For example, the detection system may calculate average luminance for blocks with a size of 16-by-16 pixels, blocks with a size of 8-by-8 pixels, and blocks with a size of 4-by-4 pixels. The detection system generates the feature vector by concatenating the average luminance for each block for each block size into a single vector.

In one embodiment, the detection system reduces the dimensions of a feature vector to achieve a more compact representation of the image and to reduce small noise and potential value drifting by omitting the least significant dimensions. The detection system generates a transform matrix for transforming a feature vector to a reduced feature vector using principal component analysis ("PCA") as follows. The detection system may use a collection of images as training data to generate the transform matrix. The detection system generates a feature vector for each image of the training data and represents the feature vectors in a matrix. The detection system then calculates eigenvectors and eigenvalues for the matrix. The detection system selects the eigenvectors with the highest eigenvalues in eigenvalue order to form the transform matrix. The detection system selects a number of eigenvectors that is equal to the number of the reduced dimensions. When generating a hash code, the detection system uses the transform matrix to transform a feature vector into a reduced feature vector of reduced dimensions. Principal component analysis has the characteristic that the eigenvectors with the highest eigenvalues represents the most significant component. Thus, the first elements or left-most elements in the reduced feature vector will be the most significant. The detection system also uses the transform matrix to transform each feature vector of the training data to a reduced feature vector. The detection system then calculates the mean of each element (or dimension) of the reduced feature vectors.

In one embodiment, the detection system creates the hash code from the reduced feature vector by allocating a single bit of the hash code for each element of the reduced feature vector. Alternatively, the detection system may select a smaller number of bits for the hash code than the number of dimensions. The detection system may set the value of each bit to 0 or 1 depending on whether the value of the corresponding element in the reduced feature vector is below or above the mean value of the elements of the reduced feature vector of the training data. The calculation of the values for the bits of the hash code is represented as follows.

$$H_k = \begin{cases} 1 & \text{if } G_k > \text{mean}_k \\ 0 & \text{if } G_k \leq \text{mean}_k \end{cases}$$

where $H_k$ represents the value of the $k^{th}$ bit of the hash code and $\text{mean}_k$ is the mean value of dimension k in the images of the training data. One skilled in the art will appreciate that values of the hash code can be set using mathematical derivations of the training data other than mean, such as mode or median. An alternative technique for generating a hash code for an image is described in U.S. patent application Ser. No. 11/233,352, entitled "Generating Search Requests from Multimodal Queries" and filed on Sep. 21, 2005, now U.S. Pat. No. 7,457,825 issued Nov. 25, 2008, which is hereby incorporated by reference. The terms "signature" and "hash code" of an image refer to a code derived from the image. The code can be used to facilitate locating a duplicate or similar images.

In one embodiment, the detection system generates an image table for a collection of images for duplicate image detection. The detection system generates a hash code for each image in the collection. The detection system then processes each hash code by retrieving its group identifier. If that group identifier has not been processed before, the detection system may add an entry to or update an entry in the group index to point to a group table for that group identifier. If that hash code has not been processed before, the detection system may add an entry to or update an entry in the group table corresponding to the group identifier. The entry identifies the hash code (e.g., by storing the remaining bits or by its index within the group table) and adds a reference to the entry for each image that has that hash code.

After the detection system generates the image table, the detection system can use the image table to detect whether a target image is contained within the image table as a duplicate image. The detection system generates a hash code for the target image and then retrieves the target group identifier. The detection system retrieves a reference to the group table for the target group identifier from the group index. The detection system searches the group table for hash codes that are similar to the target hash code. The detection system considers hash codes to be similar when their group identifiers are the same and their remaining bits differ in less than a threshold number of positions. The detection system may represent similarity by the following:

$$1. \sum_{k=1}^{L}(H_{t,k} \oplus H_{j,k}) = 0$$

and $$2. \sum_{k=L+1}^{K}(H_{i,k} \oplus H_{j,k}) \leq T$$

where 0 represents the Boolean exclusive or operator, $H_{x,k}$ represents the $k^{th}$ bit of the hash code for image x, L is the number of bits in the group identifier, K is the number of bits in the hash code, and T is the threshold number of bits for similarity. T, K, and L are tunable parameters.

FIG. 1 is a block diagram that illustrates components of the detection system in one embodiment. The detection system 130 is connected to web sites 110 and user devices 115 via communications link 120. The detection system includes a generate image table component 131, a generate hash code of image component 132, a generate image feature vector component 133, a generate hash code from reduced feature vector component 134, and a generate transform component 135. The generate image table component generates an image table 150. Initially, the detection system may invoke the generate transform component to generate the transform matrix for dimension reduction using principal component analysis and a set of training images. The generate image table component invokes the generate hash code of image component for each image to be included in the image table. The detection system may use a conventional crawler 140 to identify images to be included in the image table and store the identified images (or references to them) in an image store 141. After generating the hash code for an image, the generate image table component updates the image table to add the hash code and reference for the image. The generate hash code of image component invokes the generate image feature vector component to generate a feature vector for an image. The generate image table component invokes the generate hash code from reduced feature vector component to create the hash code for an image. The detection system includes a detect duplicate images component 136 that receives a target image, generates a target hash code, and determines whether the image table contains a duplicate image.

The computing devices on which the detection system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the detection system. In addition, the data structures and message structures may be stored or transmitted via a data transmission medium, such as a signal on a communications link. Various communications links may be used, such as the Internet, a local area network, a wide area network, or a point-to-point dial-up connection.

The detection system may be implemented on various computing systems or devices including personal computers, server computers, hand-held or laptop devices, multiprocessor systems, microprocessor-based systems, network PCs, minicomputers, mainframe computers, distributed computing environments that include any of the above systems or devices, and the like. The detection system may also provide its services to various computing systems such as personal computers, cell phones, personal digital assistants, consumer electronics, home automation devices, and so on.

The detection system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the generate image table component and the detect duplicate image component may be implemented on different computer systems.

Figure 2:
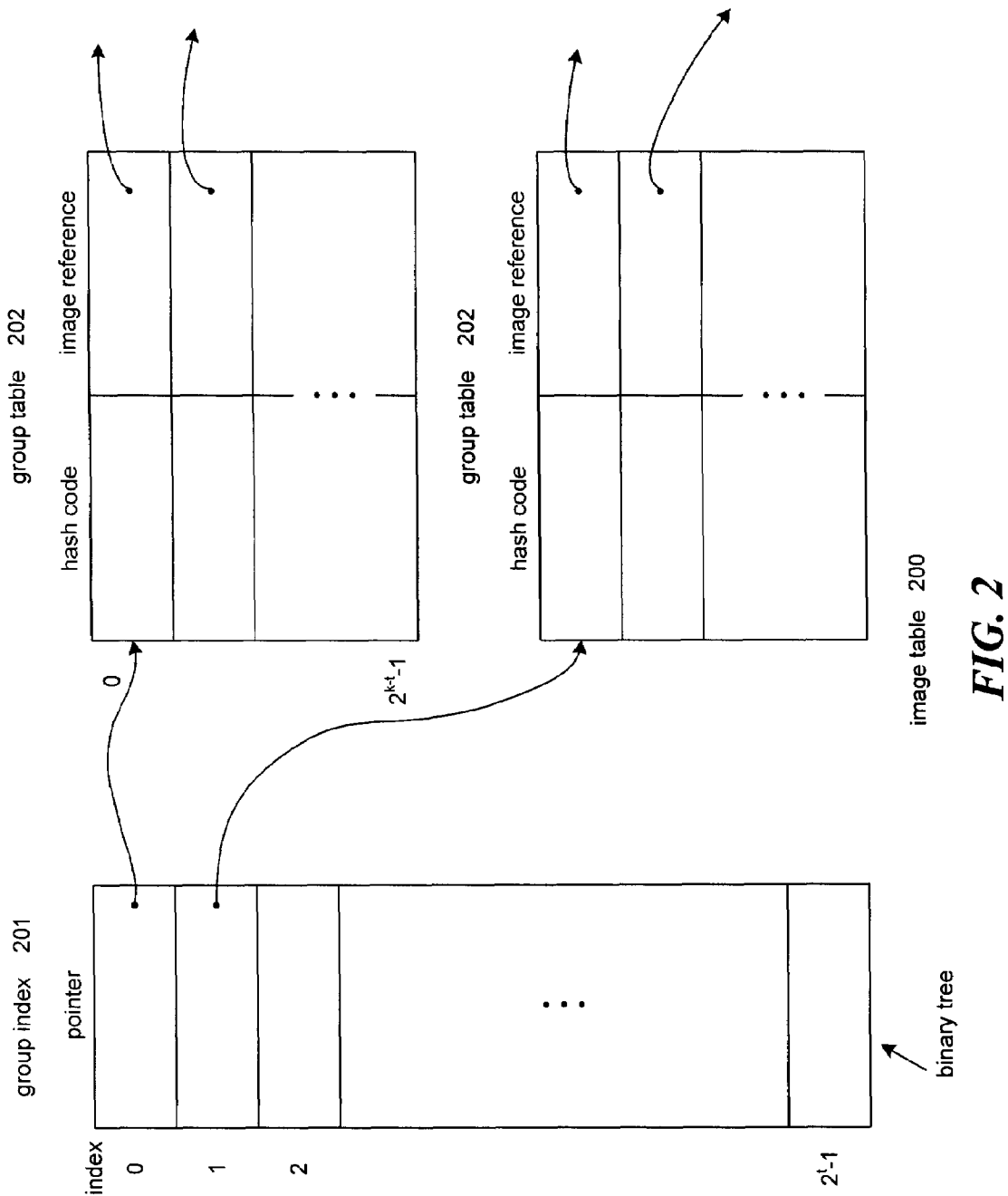
FIG. 2 is a block diagram that illustrates an example image table in one embodiment.

FIG. 2 is a block diagram that illustrates an example image table in one embodiment. The image table 200 includes a group index 201 and a group table 202 for each group identifier of the group index. The group index as illustrated is a table that contains an entry for each possible value of a group identifier. Although illustrated as a table in this example, the group index can be implemented using a variety of data structures including a binary tree, a hash table, a linked list, and so on. Each group table contains an entry for each possible hash code with the corresponding group identifier. Each entry may contain the corresponding hash code and references to the images with that hash code. Although illustrated as a table in this example, the group table can also be implemented using a variety of data structures. In addition, the group table may be organized to facilitate searching for hash code values that differ in less than a threshold number of bits. For example, if the threshold number of bits is 3, then a hash code with 8 1s and 16 0s in its remaining bits cannot be similar to hash codes with less than 5 1s or greater than 11 1s or with less than 13 0s or greater than 19 0s. More generally, if the sum of the difference in the number of 1s and the number of 0s is greater than the threshold, then the hash codes are not similar. Thus, the image table may use an auxiliary table to map each remaining value to its potentially similar remaining values, which can be shared by all group tables. One skilled in the art will appreciate that the group table can be logically embedded in the corresponding entries of the group index rather than being referenced by an entry.

Figure 3:
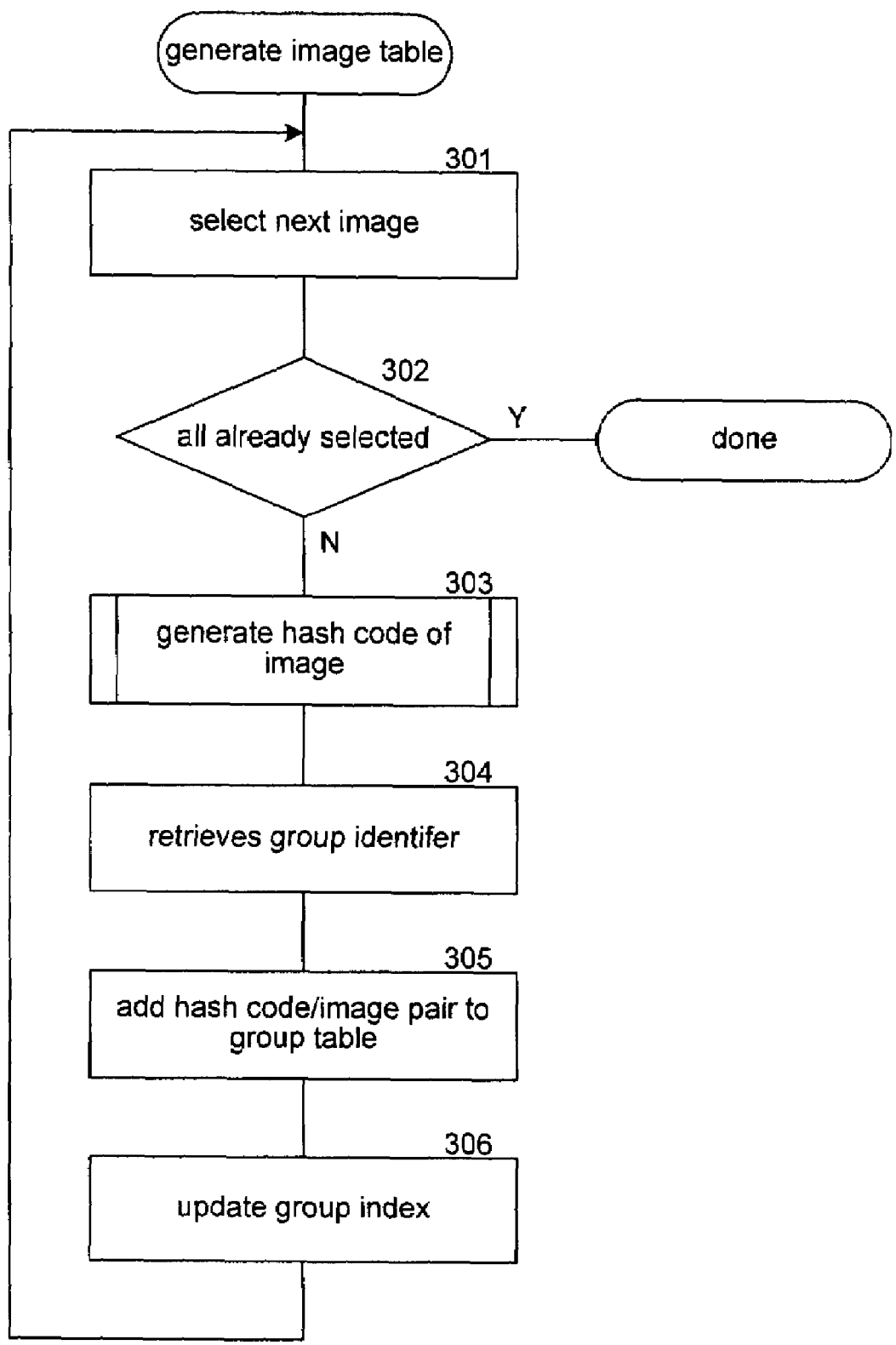
FIG. 3 is a flow diagram that illustrates the processing of the generate image table component of the detection system in one embodiment.

FIG. 3 is a flow diagram that illustrates the processing of the generate image table component of the detection system in one embodiment. The component loops selecting each image to be included in the image table, calculates its hash code, and adds the image to the image table. In block 301, the component selects the next image to be included in the image table. In decision block 302, if all the images have already been selected, then the component completes, else the component continues at block 303. In block 303, the component invokes the generate hash code of image component passing the selected image to generate the hash code for the selected image. In block 304, the component retrieves the group identifier from the generated hash code. In block 305, the component adds an image reference for the hash code to the group table corresponding to the group identifier. In block 306, the component updates the group index for the group identifier as appropriate and loops to block 301 to select the next image.

Figure 4:
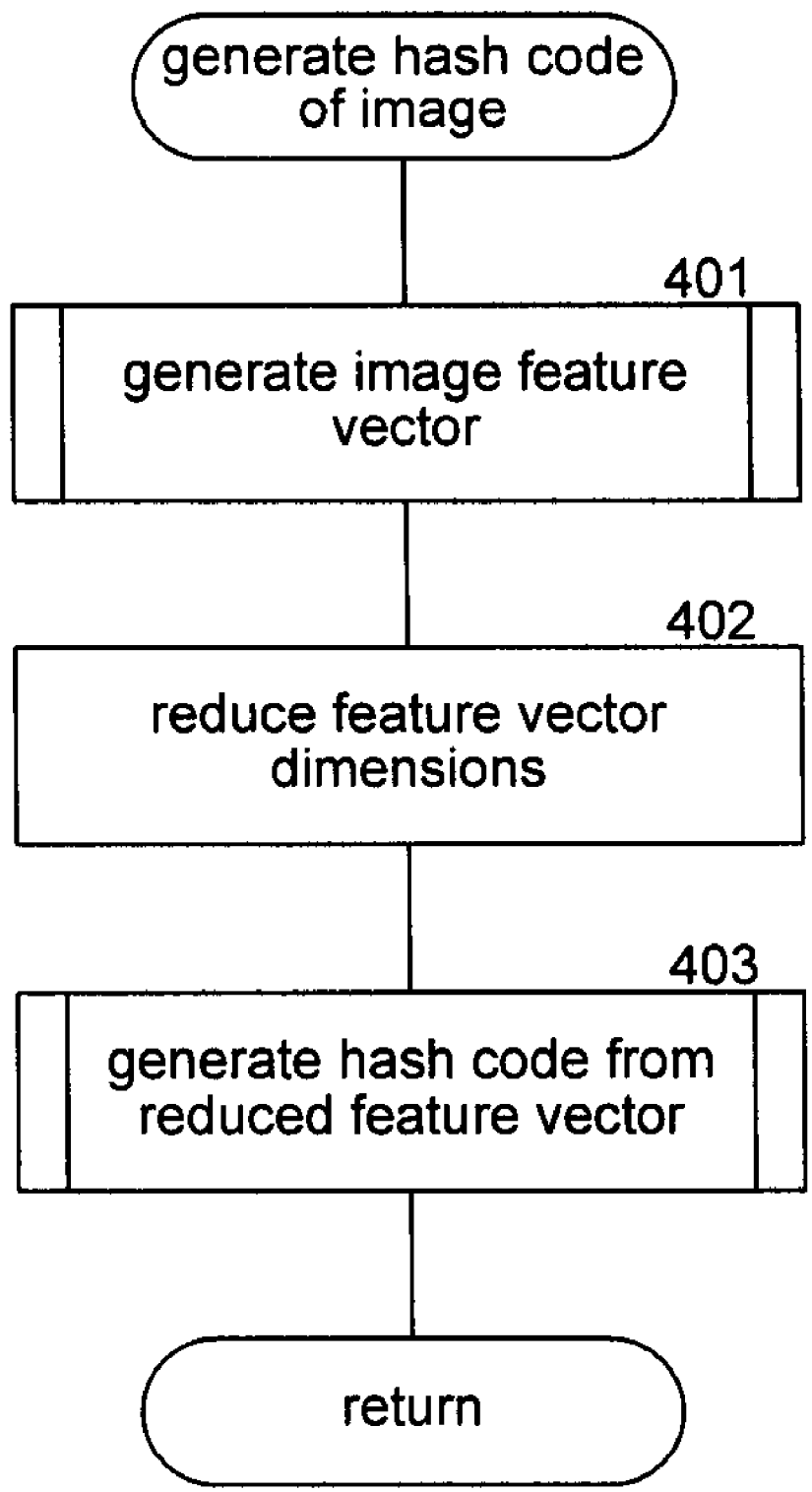
FIG. 4 is a flow diagram that illustrates the processing of the generate hash code of image component of the detection system in one embodiment.

FIG. 4 is a flow diagram that illustrates the processing of the generate hash code of image component of the detection system in one embodiment. In block 401, the component invokes the generate image feature vector component to generate a feature vector for the passed image. In block 402, the component applies the transform matrix to the feature vector to generate the reduced feature vector. In block 403, the component invokes the generate hash code from reduced feature vector component to create the hash code for the passed image and then returns.

Figure 5:
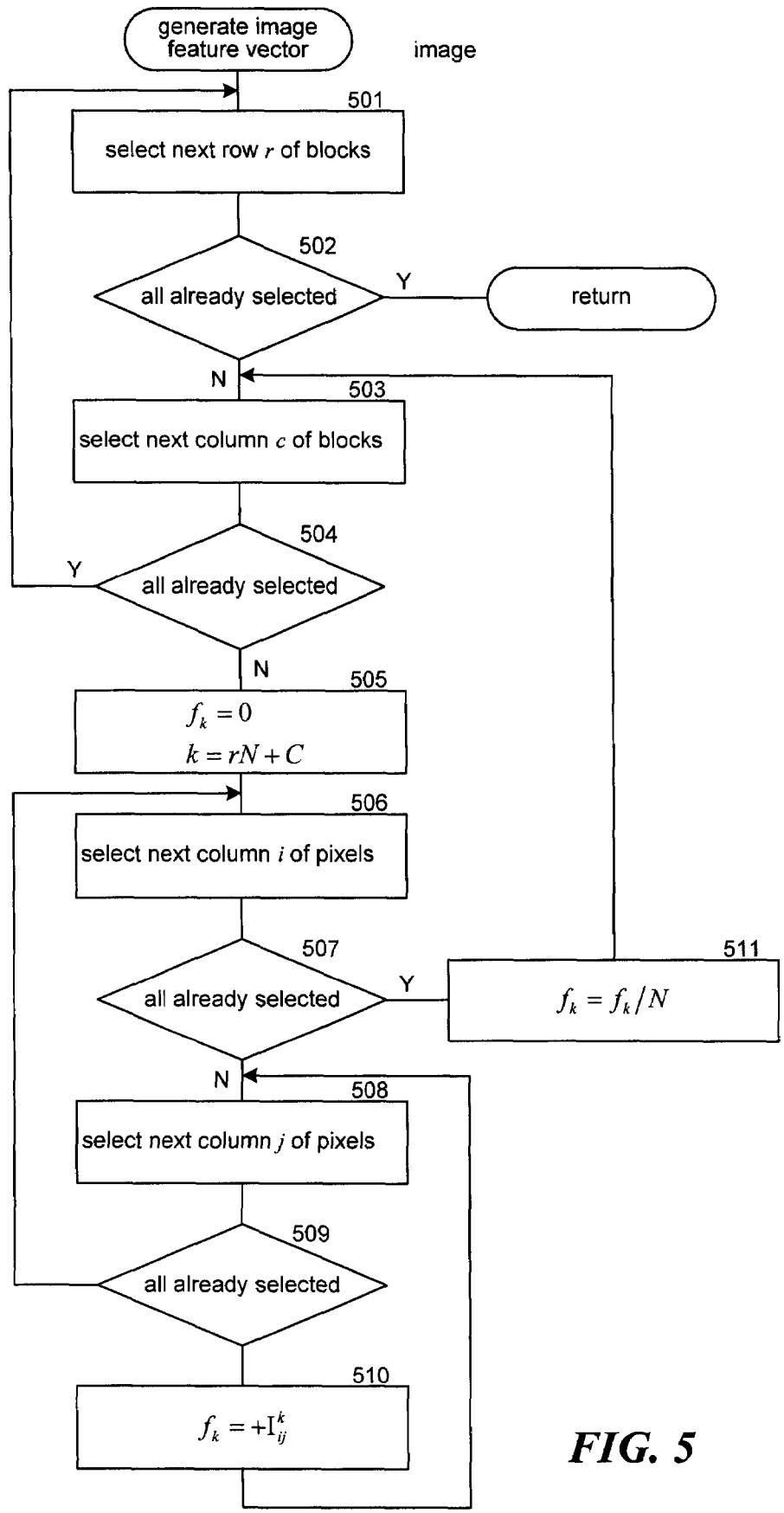
FIG. 5 is a flow diagram that illustrates the processing of the generate image feature vector component of the detection system in one embodiment.

FIG. 5 is a flow diagram that illustrates the processing of the generate image feature vector component of the detection system in one embodiment. The component generates a feature vector based on average luminance within blocks of a grayscale representation of the image. In block 501, the component selects the next row of blocks. In decision block 502, if all the rows have already been selected, then the component returns, else the component continues at block 503. In block 503, the component selects the next column of blocks for the selected row. In decision block 504, if all the columns have already been selected, then the component loops to block 501 to select the next row, else the component continues at block 505. In block 505, the component calculates the index within the feature vector for the block represented by the selected row and column and initializes the total luminance, which is used to calculate average luminance, to zero. In block 506, the component selects the next row of pixels within the selected block. In decision block 507, if all the pixels have already been selected, then the component continues at block 511, else the component continues at block 508. In block 508, the component selects the next column of pixels for the selected row of pixels. In decision block 509, if all the columns have already been selected, then the component loops to block 506 to select the next row, else the component continues at block 510. In block 510, the component adds luminance of the selected pixel to a total luminance for the selected block. The component then loops to block 508 to select the next column of pixels. In block 511, the component divides the total luminance by the number of pixels in the selected block to generate the average luminance for the block. The component then loops to block 503 to select the next column of blocks.

Figure 6:
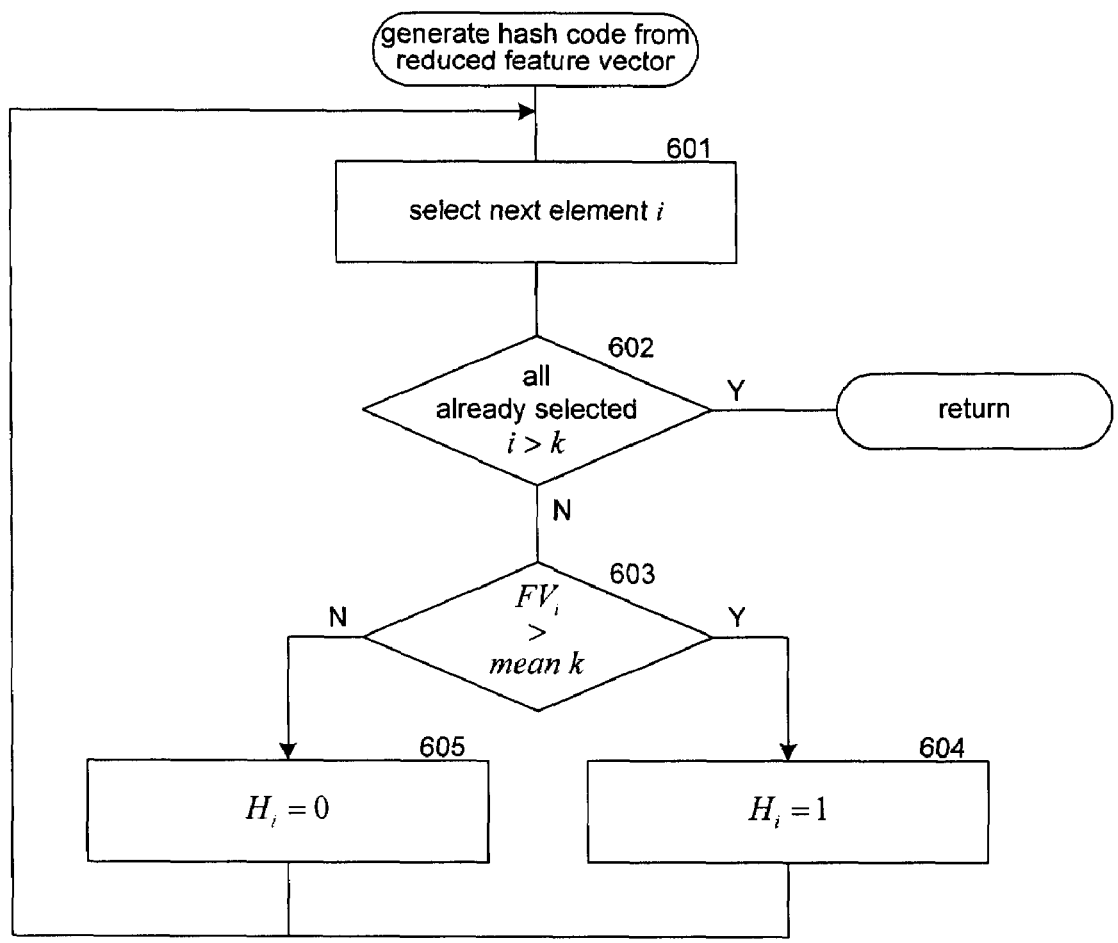
FIG. 6 is a flow diagram that illustrates the processing of the generate hash code from reduced feature vector component of the detection system in one embodiment.

FIG. 6 is a flow diagram that illustrates the processing of the generate hash code from reduced feature vector component of the detection system in one embodiment. In block 601, the component selects the next element of the reduced feature vector. In decision block 602, if all the features have already been selected, then the component returns, else the component continues at block 603. In decision block 603, if the value of the feature vector for the selected element is greater than the mean for that element, then the component continues at block 604, else the component continues at block 605. In block 604, the component sets the value of the hash code for the selected element to 1. In block 605, the component sets the value of the hash code for the selected element to 0. The component then loops to block 601 to select the next element of the reduced feature vector.

Figure 7:
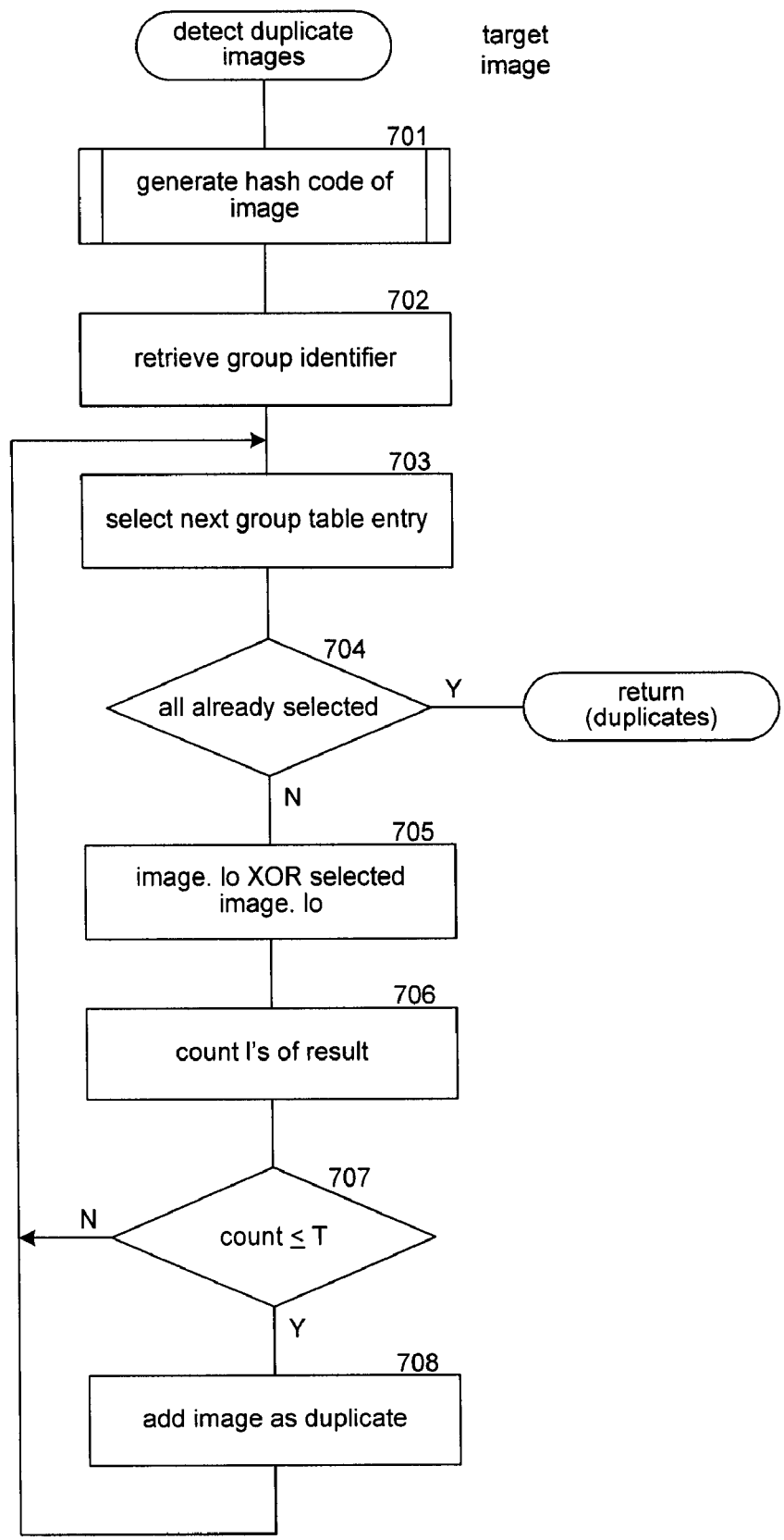
FIG. 7 is a flow diagram that illustrates the processing of the detect duplicate images component of the detection system in one embodiment.

FIG. 7 is a flow diagram that illustrates the processing of the detect duplicate images component of the detection system in one embodiment. The component is passed a target image and identifies the duplicate images within the image table. This component may be adapted to handle the particular data structure used to represent the group index. In block 701, the component invokes the generate hash code of image component passing the target image. In block 702, the component retrieves the group identifier from the target hash code. In blocks 703-708, the component loops determining whether the group table for the group identifier contains hash codes that are similar to the target hash code. In block 703, the component selects the next row of the group table. In decision block 704, if all the rows have already been selected, then the component returns the identified duplicate images, if any, else the component continues at block 705. In block 705, the component computes the exclusive—or of the remaining bits of the target image and the selected image. In block 706, the component counts the 1s of the result. In decision block 707, if the count of the 1s is less than or equal to the threshold, then the component continues at block 708, else the component loops to block 703 to select the next row of the table. In block 708, the component adds the images referenced by the selected entry as duplicate images and loops to block 703 to select the next row of the table.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the detection system may be used to detect similar images rather the strictly duplicate images. The threshold for similar may be adjusted to reflect the desired similarity between images. Also, although the term hash code has been used above, the hash code may be considered to be any compact code representing an image with elements having varying levels of significance in representing the image. Accordingly, the invention is not limited except as by the appended claims.

We claim:

1. A computer system with a processor for detecting similar images, comprising:
   a generate code component that generates a code for an image, the code having elements whose values are derived from features of the image, the elements having varying levels of significance such that similar images have similar codes with the most significant elements having the same values, the code being generated by creating a feature vector of a certain dimension that represents the image, reduces the dimension of the feature vector, and creates a code from the reduced feature vector with the reduced dimension;
   an image table that groups images based on having the same values for the most significant elements; and
   a detection component that uses the generate code component to generate a code for a target image, that identifies the group of images with the same values for the most significant elements as the generated code, and that identifies, from the images within the identified group, images whose codes vary less than a threshold amount from the code of the target image.

2. The computer system of claim 1 including a generate image table component that generates the image table by generating codes for images and grouping together images that have the same values for the most significant elements.

3. The computer system of claim 2 wherein the image table contains a group index that is indexed by the most significant elements and contains a reference to a group table for each value of the most significant elements.

4. The computer system of claim 3 wherein a group table maps the codes of images within the group to the images.

5. The computer system of claim 1 wherein the generate code component generates the code as a vector with the reduced dimension with a value set to 0 or 1 depending on the value of the corresponding element in the feature vector with the reduced dimension.

6. The computer system of claim 5 wherein the value of an element is set to 0 or 1 based on the value of the corresponding element of the feature vector with the reduced dimension relative to a mean of the values of the elements of the feature vector with the reduced dimension.

7. The computer system of claim 1 wherein the threshold amount corresponds to the count of values of elements of the least significant elements that are different.

8. A computer-readable storage medium storing computer-executable instructions for controlling a computer to detect similar images by a method comprising:
generating a code for an image by
generating a feature vector of a certain dimension that represents the image;
reducing the dimensions of the feature vector; and
creating a code from the feature vector with the reduced dimensions, the code having an element for each of the reduced dimensions of the feature vector, each element having a value of 0 or 1 that is derived from the corresponding feature of that reduced dimension, the elements having varying levels of significance such that similar images have similar codes with the most significant elements having the same values;
generating an image table that groups images by the most significant elements of their codes; and
identifying images that are similar to a target image by
generating a target code for the target image;
identifying from the image table a group of images with the same values for the most significant elements of their codes as the target code;
identifying, from the images within the identified group, images whose codes vary less than a threshold amount from the target code of the target image
wherein the identified images represent images that are similar to the target image.

9. The computer-readable storage medium of claim 8 wherein the image table has a group index that is indexed by the most significant elements of a code, each entry of the group index having a reference to a group table identifying images within a group.

10. The computer-readable storage medium of claim 9 wherein a group table maps the codes of images within the group to the images.

11. The computer-readable storage medium of claim 8 wherein the code is created as a vector with the reduced dimension with a value of an element set to 0 or 1 depending on the value of the corresponding feature in the feature vector with the reduced dimension.

12. The computer-readable storage medium of claim 8 wherein the value of an element is set to 0 or 1 based on the value of the corresponding feature of the feature vector with the reduced dimension relative to a mean of values of the feature of the feature vector with the reduced dimension of the images grouped by the image table.

13. The computer-readable storage medium of claim 12 wherein the threshold amount corresponds to the count of values of elements of the least significant elements that are different.

* * * * *

UNITED STATES PATENT AND TRADEMARK OFFICE
CERTIFICATE OF CORRECTION

PATENT NO.       : 7,647,331 B2                                             Page 1 of 1
APPLICATION NO.  : 11/277727
DATED            : January 12, 2010
INVENTOR(S)      : Li et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 329 days.

Signed and Sealed this

Twenty-eighth Day of December, 2010

David J. Kappos
*Director of the United States Patent and Trademark Office*